Dec. 17, 1940.   F. X. DOSTAL   2,225,335
CURRENT CONVERTING CONTACTOR MECHANISM
Filed Feb. 8, 1939   3 Sheets-Sheet 2

INVENTOR.
FRANK X. DOSTAL
BY S. Michael Prueles
ATTORNEYS.

INVENTOR.
FRANK X. DOSTAL
BY S Michael Pueles
ATTORNEYS.

Patented Dec. 17, 1940

2,225,335

UNITED STATES PATENT OFFICE 2,225,335

CURRENT CONVERTING CONTACTOR MECHANISM

Frank X. Dostal, New York, N. Y., assignor to Transformer Corporation of America, New York, N. Y., a corporation of New York Application February 8, 1939, Serial No. 255,239

2 Claims. (Cl. 171—97)

This invention relates to current converting contactor mechanisms and more particularly to a current converting contactor mechanism utilized in combination with A. C. operated devices for enabling operation of such A. C. device either from a D. C. source or from an A. C. source. Among the objects of the invention is an improved current converting mechanism of such type which will automatically supply to an alternating current load to which it is connected alternating current irrespective whether the current converting mechanism is supplied from a D. C. source or an A. C. source.

The foregoing and other objects of the invention will be best understood from the following description of exemplifications thereof, reference being had to the accompanying drawings, wherein Fig. 1 is a diagrammatic diagram of a current converting mechanism and its operating circuits exemplifying one form of the invention;

Many devices, such as amplifiers, phonograph motors, which are primarily designed to operate with alternating current have frequently to be operated from a direct current source. In order to enable operation of such A. C. devices either from an A. C. source or a D. C. source, such devices are often provided with a current converting pole-changing contactor mechanism arranged to convert current from the D. C. source into alternating current pulsations with which the A. C. device is energized. In the past, A. C. devices equipped with such current converting contactor mechanism had to be provided with a separate manually operated switch or relay arrangement so as to cut out the current converting contactor mechanism when the device was supplied from an A. C. source and to interconnect the current converting contactor mechanism in the supply circuit to the device when it was supplied from a D. C. source. Frequently, such switching mechanism is not thrown to the correct position, bringing about damage to the apparatus or, in less severe cases, the blowing of a fuse. To avoid such difficulties, attempts have been made to provide relay arrangements for automatically cutting out the current converting mechanism when the device is connected to an A. C. source and for interconnecting the current converting mechanism in the supply circuit when the A. C. device is operated from a D. C. source.

The current converting contactor mechanism of the invention eliminates such special switching or relay arrangements and the expense and complications connected with the use of additional relays and wiring as well as the other disadvantages inherent in the use of such switching arrangements, and makes possible foolproof operation of a device designed for operation with alternating current when supplied from either a D. C. source or an A. C. source, without requiring any additional switching or relay mechanisms.

Figure 1:
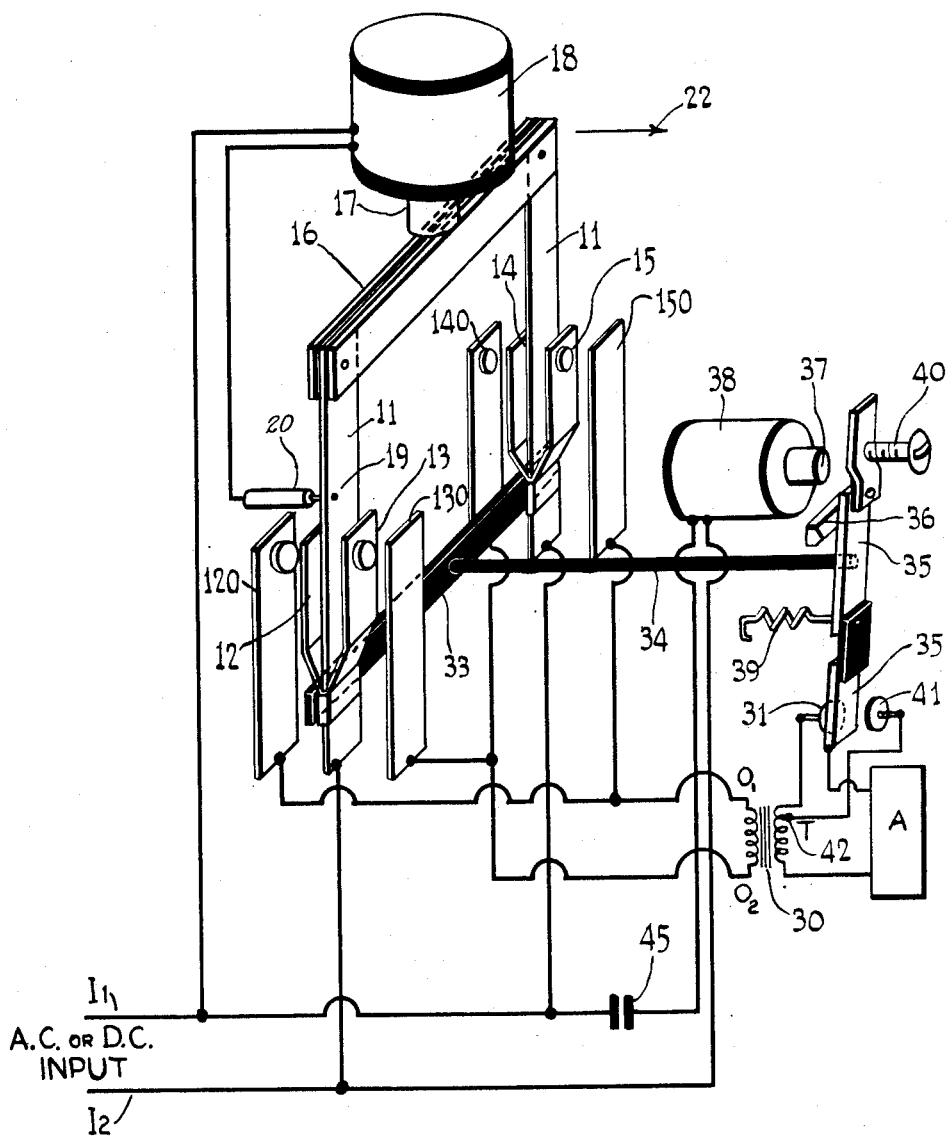
Figures 2, 3:
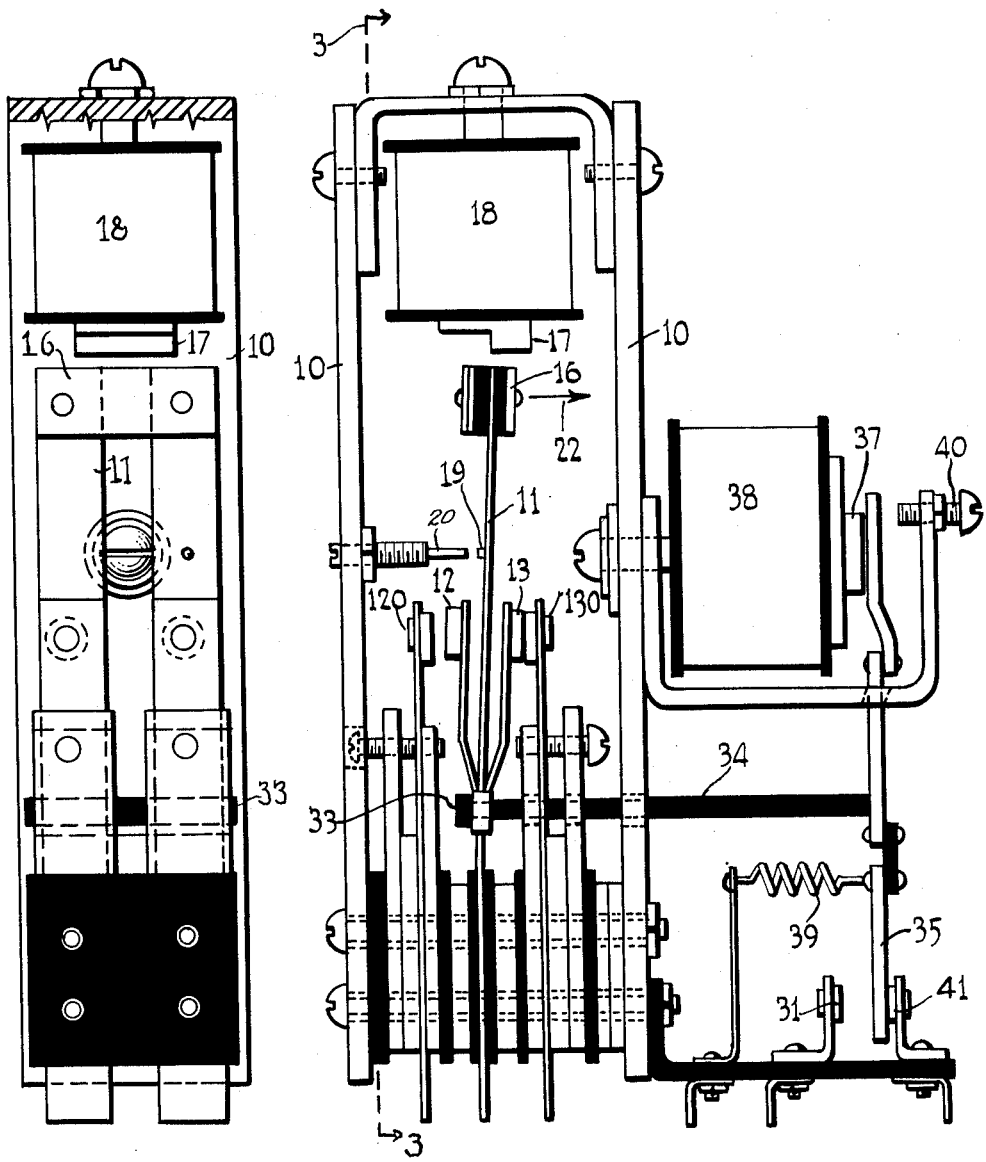
Fig. 2 is an elevational view of the mechanism of Fig. 1.
Fig. 3 is a vertical cross-sectional view of the device of Fig. 1 along line 3—3 of Fig. 2.

In Figs. 1 to 3 is shown an exemplification of the invention as applied to a current converting vibratory contactor mechanism of the pole-changing type. The vibratory contactor mechanism comprises a suitable frame 10 supporting a pair of vibratory reeds 11 carrying two sets of contact members 12—13, 14—15 for cooperation with sets of stationary spring contact members 120—130, 140—150 which are insulatingly mounted on the framework 10. The vibrating reeds 11 are provided with a magnetic armature member 16 cooperating with a suitably arranged electromagnet formed of a core 17 and actuating coil 18 for imparting to the reeds 11 a vibratory motion when the coil 18 is periodically energized. The reeds 11 and their contact pairs 12—13, 14—15 are shown connected to input leads $I_1$, $I_2$ that may be supplied either from a direct current source or an alternating current source. The actuating coil 18 of the electromagnet core 17 is likewise connected to the input leads $I_1$, $I_2$ through a circuit including a stationary interrupter contacts 20 and the vibratory interrupter contact 19 mounted on one of the reeds 11 so that when the reed is in its neutral de-energized position, the energizing circuit from the input leads $I_1$, $I_2$ to the actuating coil 18 is completed. The core 17 of the electromagnet is so placed relatively to the armature 16 of the reed mechanism that when the input leads $I_1$, $I_2$ are connected to a direct current source, the coil 18 is energized to pull the reed armature 16 in the direction of the arrow 22 and break the interrupter contacts 19—20, and thus set the reed into vibrations for alternatingly bringing about the engagement of the opposite sets of contacts 12—120, 14—140 or 13—130 and 15—150.

This periodical vibratory motion of the reeds 11 converts the D. C. currents supplied to the input leads $I_1$, $I_2$ into alternating current pulsations delivered through the pairs of stationary contacts 120—150 and 130—140 to output leads O₁, O₂ respectively through which an A. C. device, such as an amplifier A, is to be supplied. In the drawings, the amplifier A is shown connected to the output leads O₁, O₂ through a transformer 30, the secondary winding of which is connected through a contactor 31 to the amplifier A.

The transformer and the other elements of the input circuit of the A. C. device, such as the amplifier, are so designed and proportioned that when the input leads I₁, I₂ are connected to a D. C. source for instance 110 volts, the vibratory current converting mechanism will be set into vibratory motion to alternately close the contact pairs 12—120, 14—140 or the contact pairs 13—130, 15—150 for converting the direct current into alternating current pulses which are delivered in a suitably smoothed-out form to the operating circuits of the amplifier.

In accordance with the invention, the vibratory contact mechanism described above, which converts D. C. to A. C. when it is connected to a D. C. source, is provided with a control mechanism so arranged that when its input leads are connected to an A. C. source, it remains stationary and establishes a permanent supply circuit connection from its input leads I₁, I₂ to its output leads O₁, O₂ and to the A. C. apparatus connected thereto.

In the exemplifications of the invention shown in Figs. 1 to 3, the control arrangement comprises a shoulder member 33, which, in its normal position, does not interfere with the free vibrations of the reeds 11, but which may be actuated, for instance, by means of a pull rod 34, to engage the reeds 11 and bend them to establish permanent connections between the contacts 13—130 and 15—150, and thereby establish permanent connections from the input leads I₁, I₂ to the output leads O₁, O₂, and therethrough to the alternating current device A.

The actuating rod 34 may be arranged to be operated, for instance, by an armature 35 pivoted at 36 and arranged to be actuated by an electromagnet formed of a core 37 and a coil 38 to swing the armature 35, against the biasing action of a spring 39, away from its stop 40 towards the magnet core 37 and pull the shoulder member 33 so as to flex the reeds 11 to the position in which they retain the contacts 13—130, 15—150 permanently closed.

Since a pole-changing vibratory current converting contactor mechanism of the type described above gives a different effective A. C. voltage than the D. C. input voltage, the transformer may be provided with a suitable voltage tap to which D. C. device is connected by the auxiliary control mechanism when the device is operated from a D. C. source so as to assure that the A. C. device is operated with the required voltage irrespective of whether it is supplied from a D. C. source or an A. C. source.

In accordance with the invention, the movement of the armature member 35 is also utilized to connect the A. C. device A to a different transformer tap so as to match the impedance of the A. C. device with the input circuit, for instance, by breaking the connection of the A. C. device A to the transformer 30 at the contact 31 and connecting the A. C. device to a transformer tap when the armature 35 is tilted from the stop 40 toward the core 37 into engagement with the contact 41.

As shown in Fig. 1, the actuating coil 38 of the auxiliary control arrangement is arranged to be energized from the input leads A through a series condenser 45 only when the input leads I₁, I₂ are connected to an A. C. source. By proportioning the condenser 45 so that it forms with the inductance of the electromagnet coil 38 a resonant circuit, efficient operation of the auxiliary electromagnet mechanism 37, 38 under A. C. operating conditions will be assured while preventing its operation when connected to a D. C. source.

With such arrangement, the auxiliary control electromagnet 37—38 will remain deenergized when the input leads I₁, I₂ are connected to a D. C. supply and the current converting contactor mechanism will operate with the connections arranged in the way shown in Fig. 1 to convert the D. C. into alternating current supplied to the amplifier A or some other A. C. device connected to the output leads O₁, O₂. However, if the input leads I₁, I₂ are connected to an A. C. source, the control electromagnet 37, 38 will be immediately energized to actuate the vibratory contacts 13, 14 of the contactor mechanism to permanently connect the input leads I₁, I₂ to the output leads O₁, O₂ for supplying A. C. to the A. C. device.

Furthermore, the control arrangement is also utilized to perform additional switching operations, establishing at the auxiliary contacts 31, 41 the connections of the A. C. device to different transformer taps for securing automatic conversion from A. C. to D. C. operation and vice versa, and at the same time establish additional circuits required for efficient operation under the different supply conditions.

The principles of the invention as described in connection with its exemplifications shown in Figs. 1 to 3 will suggest many other modifications thereof.

Figure 4:
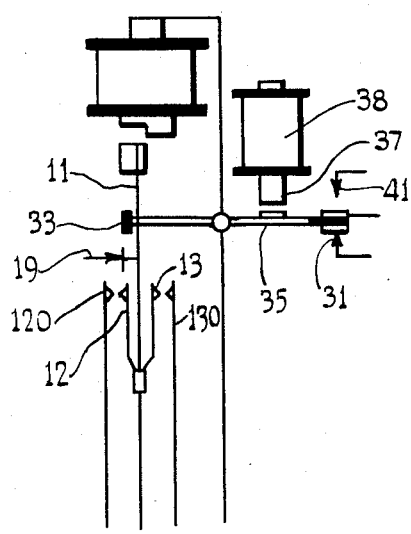
Figs. 4 to 7 are views similar to Fig. 1 illustrating other exemplifications of the invention.

Thus, in the modifications shown in Fig. 4, the armature 35 of the auxiliary control magnet 37 is arranged to directly actuate the shoulder 33 by which the reeds 11 are moved from their freely vibrating positions to the restrained positions in which contacts 13—130 and 15—150 are permanently closed for directly connecting the input leads I₁, I₂ to the output leads O₁, O₂.

Figure 5:
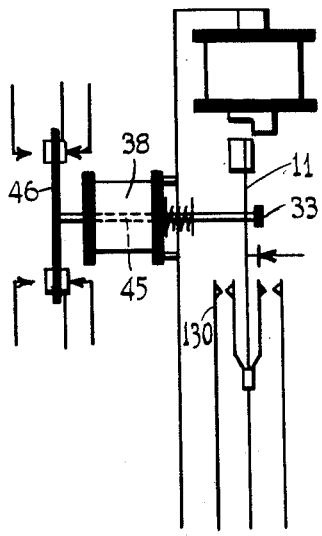

In the modification of Fig. 5, the electromagnet 37 is provided with a solenoid core 45 for directly pulling the shoulder 33 to the position in which it bends the reeds 11 to the position in which the input leads I₁, I₂ are permanently connected to the output leads O₁, O₂ while at the same time a contactor member 46 associated with the solenoid core 45 performs the auxiliary switching operations which have to be performed when changing over from operation with a D. C. supply to an A. C. supply or vice versa.

Figure 6:
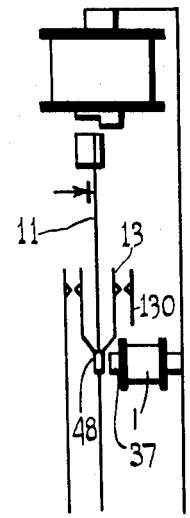

In the modifications of Fig. 6, the auxiliary control electromagnet 37 is mounted on a frame member 10 of the vibratory contactor mechanism so that when energized it attracts an armature member 48 mounted on the reed structure 11 so as to bend the reed structure 11 to the position in which it establishes a permanent connection from the input leads I₁, I₂ to the output leads O₁, O₂ and perform the auxiliary switching operations.

Figure 7:
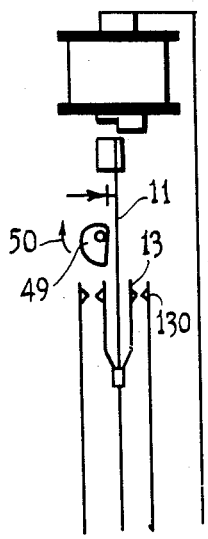

The idea underlying the invention, namely, the utilization of the pole-changing contact members of a vibratory current converting mechanism for establishing a permanent connection from the input leads of the vibratory converting mechanism to its output leads when operating with an A. C. source suggests also arrangements, such as shown in Fig. 7, in which a simple manually operated contactor cam 49 suitably mounted on the supporting frame 10 is arranged to be tilted in the direction of the arrow 50 for bending the reed structure 11 to a position in which its vibratory contacts are retained in engagement with stationary contacts for establishing permanent connection between the input leads and the output leads when operating with an A. C. supply source.

The invention is not limited to the details of construction and arrangements described herein, and many modifications thereof will suggest themselves to those skilled in the art. It is accordingly desired that the appended claims be given a broad construction commensurate with the scope of the invention.

I claim:

1. In combination with a load circuit designed for operation with alternating currents, a transformer having a primary winding and a secondary winding connected to said load circuit, two input leads, a vibrating reed contactor interposed between said input leads and the primary winding of said transformer in such manner that, when said input leads are connected to a direct current source of a predetermined voltage, said contactor is set into operation and an alternating current of a desired voltage and frequency is supplied from the secondary winding of said transformer to said load circuit, an electromagnet for vibrating said reed contactor, a circuit for energizing said electromagnet from said input leads through said contactor, an auxiliary electromagnet for actuating the vibratory element of said reed contactor to a stationary position in which said input leads remain continuously connected to the primary winding of said transformer, and a circuit for energizing said auxiliary magnet from said input leads only when said input leads are connected to an alternating current source.

2. In combination with a load circuit designed for operation with alternating currents, a transformer having a primary winding and a secondary winding connected to said load circuit, two input leads, a vibrating reed contactor interposed between said input leads and the primary winding of said transformer in such manner that, when said input leads are connected to a direct current source of a predetermined voltage, said contactor is set into operation and an alternating current of a desired voltage and frequency is supplied from the secondary winding of said transformer to said load circuit, an electromagnet for vibrating said reed contactor, a circuit for energizing said electromagnet from said input leads through said contactor, an auxiliary electromagnet for actuating the vibratory element of said reed contactor to a stationary position in which said input leads remain continuously connected to the primary winding of said transformer, and a circuit including a serially connected condenser for energizing said auxiliary magnet from said input leads only when said input leads are connected to an alternating current source.

FRANK X. DOSTAL.